United States Patent [19]

Kubota

[11] Patent Number: 4,502,735
[45] Date of Patent: Mar. 5, 1985

[54] DECELERATION-SENSITIVE TYPE HYDRAULIC BRAKE PRESSURE CONTROL VALVE FOR AUTOMOTIVE VEHICLE

[75] Inventor: Hitoshi Kubota, Minami-ashigara, Japan

[73] Assignee: Nissan Motor Company, Limited, Kanagawa, Japan

[21] Appl. No.: 499,849

[22] Filed: Jun. 1, 1983

[30] Foreign Application Priority Data

Jun. 3, 1982 [JP] Japan .................................. 57-94029
Jun. 3, 1982 [JP] Japan .................................. 57-94030

[51] Int. Cl.³ ............................................. B60T 8/14
[52] U.S. Cl. ................................... 303/24 F; 303/6 C; 303/115
[58] Field of Search .................. 303/6 C, 22 R, 24 A, 303/24 C, 24 F, 113, 115

[56] References Cited

U.S. PATENT DOCUMENTS

| 4,251,117 | 2/1981 | Kubota et al. | 303/24 F |
| 4,360,237 | 11/1982 | Maehara | 303/24 C X |
| 4,382,636 | 5/1983 | Yoshino | 303/6 C |
| 4,431,235 | 2/1984 | Cheron et al. | 303/24 C |

FOREIGN PATENT DOCUMENTS 1183199  3/1970  United Kingdom .

Primary Examiner—Duane A. Reger
Attorney, Agent, or Firm—Schwartz, Jeffery, Schwaab, Mack, Blumenthal & Koch

[57] ABSTRACT

A hydraulic brake pressure control valve for an automotive vehicle which can provide an almost ideal ratio of front wheel cylinder hydraulic brake pressure to rear wheel cylinder hydraulic brake pressure, irrespective of vehicle weight and the increase rate of hydraulic brake pressure, in order to lock the front and rear wheels simultaneously. In control valve according to the present invention, a control plunger is moved up and down in response to the pressure difference between enclosed hydraulic brake pressure and the master cylinder hydraulic brake pressure; when the vehicle is unloaded, the enclosed brake pressure is sustained by a weak spring; when the vehicle is loaded, the enclosed brake pressure is sustained additionally by a strong spring.

11 Claims, 6 Drawing Figures

DECELERATION-SENSITIVE TYPE HYDRAULIC BRAKE PRESSURE CONTROL VALVE FOR AUTOMOTIVE VEHICLE

BACKGROUND OF THE INVENTION

1. Field of the Invention

The present invention relates generally to a deceleration-sensitive type hydraulic brake pressure control valve used for a hydraulic brake system of an automotive vehicle by which the rate of increase in hydraulic brake pressure in the outlet port thereof (this pressure is applied to the rear wheel brake cylinders) is so controlled as to become smaller than that in hydraulic brake pressure in the inlet port thereof (this pressure is directly applied to the front wheel brake cylinders), and more specifically to a deceleration-sensitive type hydraulic brake pressure control valve by which the critical hydraulic brake pressure at which the rate of increase in hydraulic brake pressure is changed is controlled according to the vehicle weight. In more detail, since the greater the vehicle weight, the higher the hydraulic brake pressure at which a constant deceleration rate is obtained, therefore the critical hydraulic brake pressure obtained when a deceleration sensor detects that the vehicle deceleration rate exceeds a predetermined level increases with increasing vehicle weight. By enclosing this critical hydraulic brake pressure within an enclosed pressure chamber, the hydraulic pressure in the outlet port is restrictively controlled according to the hydraulic pressure in the inlet port on the basis of this enclosed critical hydraulic brake pressure after the vehicle deceleration rate exceeds a predetermined value.

2. Description of the Prior Art

In a hydraulic brake system for an automotive vehicle, the front and rear vehicle wheels are braked simultaneously. However, when a vehicle is braked, because the center of gravity of vehicle body inclusive of vehicle load is shifted in the frontward direction and therefore the weight applied to the rear wheels decreases, the rear wheels tend to be locked before the front wheels are locked. In case the rear wheels are locked before the front wheels are locked, this causes a danger of skid, that is, vehicle wheels slide readily without rotating while a vehicle moves onward. For the reason described above, usually a hydraulic brake control valve is provided for the hydraulic brake system for an automotive vehicle. This control valve serves to reduce the rate of increase in hydraulic brake pressure applied to the rear wheel brake cylinders in comparison with that in hydraulic brake pressure applied to the front wheel brake cylinders.

As the hydraulic brake pressure control valve of this type, a proportioning valve or a limiting valve is well known. In these valves, only a spring-actuated valve is disposed in the outlet port thereof for simply reducing the hydraulic brake pressure supplied from the outlet port, so that there exists no critical hydraulic brake pressure at which the rate of increase in hydraulic pressure is changed; that is, the brake pressure is constant irrespective of the vehicle weight. In more detail, the ratio of front wheel cylinder hydraulic brake pressure $P_f$ to rear wheel cylinder hydraulic brake pressure $P_r$ is constant regardless of the vehicle weight. However, the ideal front-and-rear wheel cylinder hydraulic brake pressure ratio ($P_f:P_r$) must be controlled according to the vehicle weight, in order to simultaneously lock the front and rear wheels. Therefore, it is necessary to increase this critical hydraulic brake pressure in proportion to an increase in vehicle weight. From this standpoint, the above-mentioned two valves are not suitable for large vehicles such as trucks or buses, because the weight of these vehicles changes markedly between where the vehicle is loaded and where the vehicle is unloaded.

To overcome the above-mentioned problem, there has been proposed a deceleration-sensitive type hydraulic brake pressure control valve. In this control valve, the deceleration rate of the vehicle is sensed; the hydraulic brake pressure obtained when the sensed deceleration rate exceeds a predetermined level is enclosed within an enclosed pressure chamber (in this case, the enclosed hydraulic brake pressure increases with increasing vehicle weight, because the more the vehicle weight, the more the hydraulic brake pressure even if the deceleration rate is constant); a so-called piston-type gravity valve (G valve) is actuated with the one end of the valve disposed within the enclosed pressure chamber, in order that the critical hydraulic brake pressure is increased with increasing vehicle weight.

In this prior-art deceleration-sensitive type hydraulic brake pressure control valve, however, if the brake pedal is abruptly depressed deeply when the vehicle is unloaded, since the response speed of the piston-type G-valve in the valve-closing direction is not high, there exists a problem in that the critical enclosed hydraulic brake pressure is increased excessively; that is, the critical brake pressure does not well correspond to the vehicle weight. To overcome this problem, an orifice is provided in the hydraulic fluid passage communicating between the master cylinder and the control valve in order to prevent the enclosed hydraulic brake pressure from rising excessively when the vehicle is braked abruptly. However, this action raises another problem in that if the brake pedal is abruptly depressed deeply when the vehicle is loaded, the enclosed hydraulic brake pressure is conversely decreased excessively; that is, the critical brake pressure does not also well correspond to the vehicle weight. This is because the presence of the orifice prevents a quick rise in the enclosed hydraulic brake pressure and therefore the piston-type G-valve is closed before the hydraulic brake pressure reaches the ideal critical pressure.

In addition to the above-mentioned drawback, in this prior-art deceleration-sensitive type hydraulic brake pressure control valve, since the hydraulic brake pressure supplied from the master cylinder is directly exposed to the inertia-sensitive gravity valve (G valve), when an emergency brake force is applied to the vehicle, a high hydraulic brake pressure directly strikes against the inertia-sensitive G-valve, thus resulting in a problem in that the stability of the G-valve responsive to deceleration rate is deteriorated. In other words, there exists a problem in that the rear wheels are locked earlier than the front wheels or the brake force is not sufficient.

A more detailed description of the prior-art deceleration-sensitive type hydraulic brake pressure control valve for an automotive vehicle will be made with reference to the attached drawings under DETAILED DESCRIPTION OF THE PREFERRED EMBODIMENTS.

SUMMARY OF THE INVENTION

With these problems in mind, therefore, it is the primary object of the present invention to provide a deceleration-sensitive type hydraulic brake pressure control valve which can prevent the enclosed critical hydraulic brake pressure from increasing excessively when the vehicle is unloaded and from decreasing excessively when the vehicle is loaded, that is, which can provide an almost ideal ratio of front wheel cylinder hydraulic brake pressure $P_f$ to rear wheel cylinder hydraulic brake pressure $P_r$, irrespective of vehicle weight and the increase rate of hydraulic brake pressure, in order to lock the front and rear wheels simultaneously.

It is another object of the present invention to provide a deceleration-sensitive type hydraulic brake pressure control valve which can improve the reliability in response speed of the deceleration sensor provided therein, irrespective of the increasing rate of hydraulic brake pressure, in order to lock the rear wheels at an appropriate timing by a sufficient brake force.

To achieve the above-mentioned primary object, the deceleration-sensitive type hydraulic brake pressure control valve according to the present invention comprises a control plunger moved up and down in response to the pressure difference between enclosed hydraulic brake pressure and the master cylinder hydraulic brake pressure in order to restrictively control the master cylinder hydraulic brake pressure in conjunction with operation of a poppet valve, an enclosed chamber piston disposed within an enclosed pressure chamber so as to control enclosed hydraulic brake pressure in accordance with the master cylinder hydraulic brake pressure, a first weak spring for always urging the piston against the enclosed hydraulic brake pressure when the vehicle is unloaded, a second strong spring for urging the piston against the enclosed brake pressure after the weak spring has been compressed a predetermined distance when the vehicle is loaded, and a deceleration sensor which can detect that the deceleration rate of the vehicle exceeds a predetermined value.

To achieve the above-mentioned second object, the deceleration-sensitive type hydraulic brake pressure control valve according to the present invention comprises deceleration sensitive means including a sensor, a plunger solenoid and a solenoid plunger so disposed as to block the enclosed pressure chamber for sustaining an enclosed brake pressure therewithin when the sensor detects a predetermined deceleration rate or including a gravity ball guide member disposed separately from the inlet passage in which the master cylinder hydraulic brake pressure is directly applied, a gravity ball disposed within the guide member, and a ball valve connected to the gravity ball by a connecting rod and so disposed as to block the enclosed pressure chamber for sustaining an enclosed brake pressure when the gravity ball moves frontward.

BRIEF DESCRIPTION OF THE DRAWINGS

The features and advantages of the deceleration sensitive type hydraulic brake pressure control valve for an automotive vehicle according to the present invention over the prior-art control valve will be more clearly appreciated from the following description of the preferred embodiments of the invention taken in conjunction with the accompanying drawings in which like reference numerals designate the same or similar elements or sections throughout the figures thereof and in which.

DETAILED DESCRIPTION OF THE PREFERRED EMBODIMENTS

To facilitate understanding of the present invention, a brief reference will be made to an example of a prior-art deceleration-sensitive type hydraulic brake pressure control valve for an automotive vehicle, with reference to the attached drawings.

Figure 1:
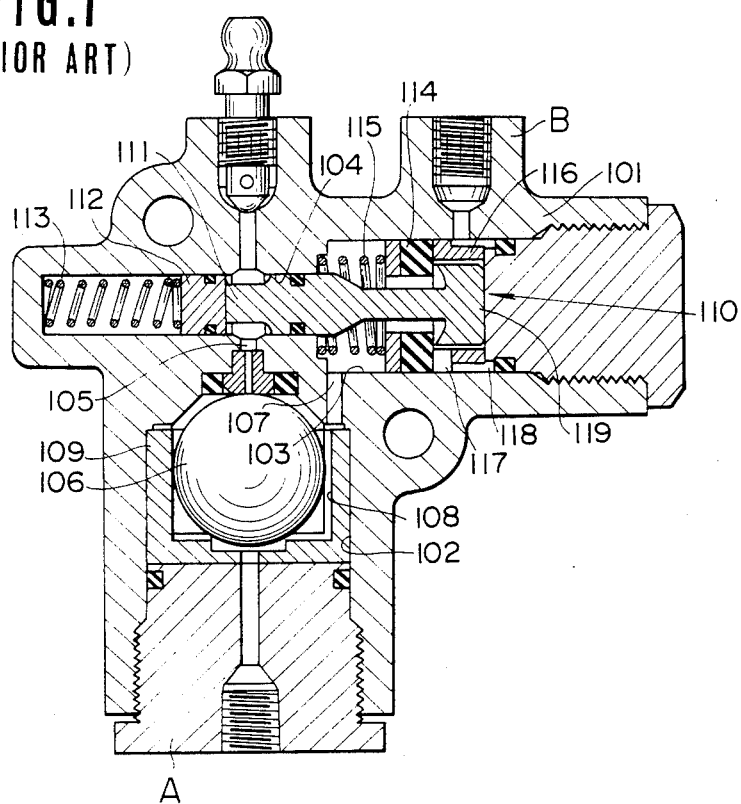
FIG. 1 is a cross-sectional view of an example of a prior-art deceleration-sensitive type hydraulic brake pressure control valve for an automotive vehicle.

In FIG. 1, the reference label A denotes an inlet port plug connected to a brake master cylinder (not shown), the reference label B denotes an outlet port plug connected to rear wheel cylinders. The reference numeral 101 denotes a valve housing having a gravity ball bore 102, an outlet port bore 103 and a piston bore 104. A passage 105 is formed between the gravity ball bore 102 and the piston bore 104. This passage 105 is controlled by the motion of an inertia-sensitive gravity ball 106. A passage 107 is formed between the gravity ball bore 102 and the outlet port bore 103; a groove 118 is formed at the outer peripheral surface of a sleeve 119 so as to communicate with the outlet port B; a groove 108 is formed on the inner surface of a gravity ball housing 109 so as to communicate with the passage 107. The reference numeral 110 denotes a piston, one end 111 of which is fitted to the piston bore 104. The small-diameter portion of the piston 110 forms an annular space which communicates with the passage 105. The piston 110 is urged in the rightward direction (in FIG. 1) by a spring 113 via an auxiliary piston 112. Within the outlet bore 103, there are housed an annular valve seat 114 urged toward the sleeve 116 by a spring 115. The sleeve 116 includes a passage 117 in relation to the valve seat 114. The piston 110 is formed with a piston head 119 which is brought away from the valve seat 114 by the spring 113 because the elastic force of the spring 113 is greater than that of the spring 115. Further, the gravity ball 106 is so disposed within the ball housing 109 as to be brought away from the passage 105 when the deceleration rate is not high; in other words, the ball 106 is normally behind the passage 105 in relation to the direction of vehicle travel by virtue of inclination of the bore 102 when the valve housing 101 is mounted.

When the brake pedal is released or when the hydraulic brake pressure is not high, the gravity ball 106 is away from the passage 105 and the piston valve 119 is brought away from the valve seat 114. Therefore, the hydraulic fluid freely flows through the control valve, from the inlet plug (port) A, the gravity ball housing 109, the groove 108, the passage 107, the bore 103, the clearance between the valve seat 114 and the valve piston 119, the passage 117, the groove 118, to the outlet plug (port) B.

When the brake pedal is depressed and therefore the deceleration rate of the vehicle exceeds a predetermined value, the gravity ball 106 moves frontward to a position at which the passage 105 is closed, in order to enclose the hydraulic brake pressure within the piston bore 104. Under these conditions, when the hydraulic brake pressure further increases, the piston 119 is moved in the leftward direction against the elastic force of the spring 113 to close the piston valve. This is because the hydraulic brake pressure applied to the piston 119 from the right side (bore 103) is higher than the enclosed hydraulic brake pressure applied to the piston from the left side (bore 104).

When the master cylinder hydraulic pressure further increases after the piston valve has been closed, the piston 119 is then moved in the rightward direction to open the piston valve. This is because the area of the piston head 119 exposed to the hydraulic brake pressure is wider than that of the piston rod fitted to the bore 104.

The above-mentioned piston valve closing and opening operations are repeated, so that the hydraulic brake pressure supplied from the master cylinder through the inlet plug A is restrictively controlled into a lower hydraulic brake pressure at the outlet plug B to which the rear wheel cylinders are connected.

When the master cylinder brake pressure is released, since the enclosed pressure is higher than the master cylinder pressure, the piston 119 returns to the original position. Further, the gravity ball 106 also returns to the original position, since the pressure applied to the forward side of the gravity ball 106 is higher than the rearward side of the ball 106.

In the above-mentioned prior-art deceleration-sensitive type hydraulic brake pressure control valve, however, if the brake pedal is depressed abruptly when the vehicle is unloaded, the piston valve 119 does not move quickly in the leftward direction to close the piston valve. This is because the difference in the piston area (to which the brake pressure is applied) between the enclosed bore side 104 and the outlet bore side 103 is zero and therefore the piston is moved in dependence upon only the pressure difference between the two sides. Therefore, the enclosed hydraulic brake pressure tends to become excessively high.

Figure 2:
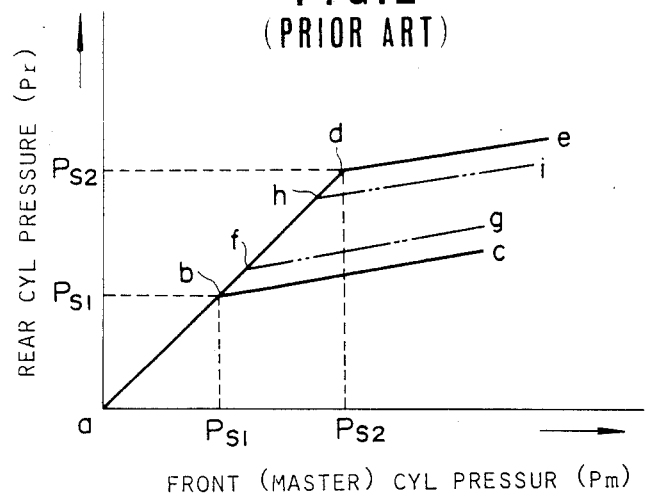
FIG. 2 is a graphical representation showing the relationship between the front (master) wheel cylinder hydraulic brake pressure and the rear wheel cylinder hydraulic brake pressure in the prior-art deceleration-sensitive type hydraulic brake pressure control valve for an automotive vehicle shown in FIG. 1.

To explain this problem with reference to FIG. 2, the line a-d shows the case where the front (master) wheel cylinder hydraulic brake pressure $P_m$ is equal to the rear wheel cylinder hydraulic brake pressure $P_r$; that is to say, where the deceleration rate of the vehicle is relatively small. In the case when the vehicle is decelerated beyond a predetermined value under unloaded conditions (this valve is detected by the gravity ball 106), the critical hydraulic brake pressure $P_{s1}$ must be enclosed within the piston bore 104 at point b and thereafter the rear wheel cylinder brake pressure $P_r$ must be controlled along the line b-c in relation to the master cylinder brake pressure $P_m$. However, since the response speed of the piston valve 119 is not high, the critical brake pressure $P_r$ required when the vehicle is unloaded shifts to a higher point f and the rear wheel cylinder pressure $P_r$ is controlled along the line f-g instead of the line b-c.

To overcome this problem, an orifice is provided in the hydraulic fluid passage communicating between the master cylinder and the inlet plug A in order to prevent the enclosed hydraulic brake pressure from rising excessively. In this case, however, when the vehicle is decelerated beyond a predetermined value under loaded conditions, since the presence of the orifice prevents a quick rise in the enclosed hydraulic brake pressure, the critical brake pressure $P_r$ required when vehicle is loaded shifts from point d to a lower point h and the rear wheel cylinder pressure $P_r$ is controlled along the line h-i, in spite of the fact that the critical hydraulic brake pressure $P_{s2}$ must be enclosed within the piston bore 104 at point d and thereafter the rear wheel cylinder brake pressure $P_r$ must be controlled along the line d-e in relation to the master cylinder pressure $P_m$.

Further, in the prior-art control valve shown in FIG. 1, since the hydraulic pressure is directly applied to the G-valve 106, when an emergency brake force is applied to the vehicle, the G-valve is subject to the influence of the hydraulic brake pressure $P_m$, thus resulting in the deterioration of the stability of the G-valve response speed to deceleration rate. In such case, the rear wheels are locked earlier than the front wheels or the brake force is not sufficient.

In view of the above description, reference is now made to a first embodiment of the deceleration-sensitive type hydraulic brake pressure control valve for an automotive vehicle according to the present invention, with reference to the attached drawings.

Figure 3:
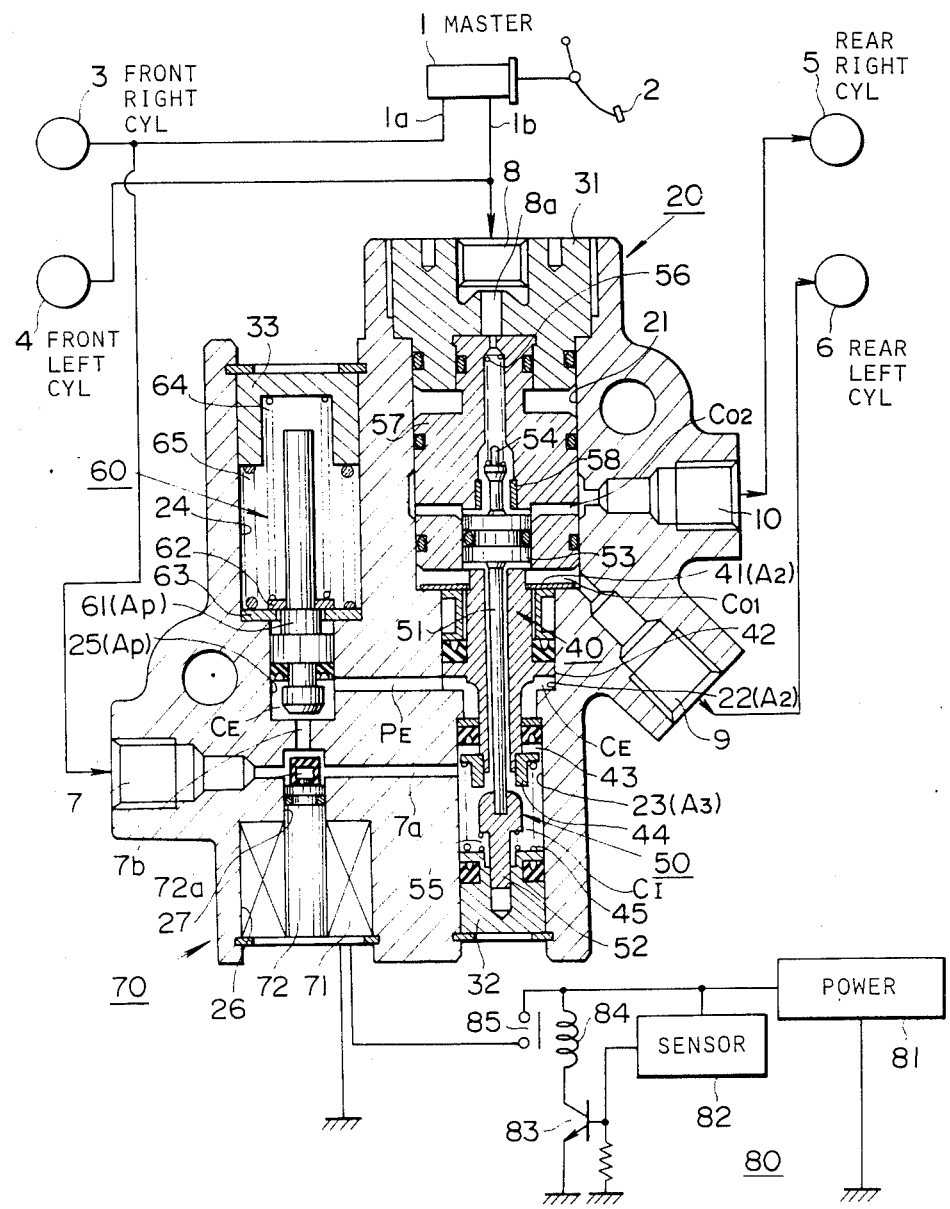
FIG. 3 is a cross-sectional view of a first embodiment of the deceleration-sensitive type hydraulic brake pressure control valve for an automotive vehicle according to the present invention.

FIG. 3 shows an exemplary deceleration-sensitive type hydraulic brake pressure control valve according to the present invention, which is applied to a dual-brake piping system for an automotive vehicle.

In FIG. 3 the reference numeral 1 denotes a brake master cylinder for the dual-brake piping system for an automotive vehicle and the reference numeral 2 denotes a brake pedal. Therefore, when the driver depresses the brake pedal 2, a hydraulic brake pressure is applied from a first outlet port 1a of the brake master cylinder 1 to a front righthand wheel cylinder 3 directly and to a rear lefthand wheel cylinder 6 through the deceleration-sensitive type hydraulic brake pressure control valve (by way of a first inlet port 7 and a first outlet port 9) and similarly from a second outlet port 1b of the brake master cylinder 1 to a front lefthand wheel cylinder 4 directly and to a rear righthand wheel cylinder 5 through the deceleration-sensitive type hydraulic brake pressure control valve (by way of a second inlet port 8 and a second outlet port 10). Since the hydraulic brake pressure developed within the brake master cylinder 1 is not applied directly but applied to the rear wheel cylinders 5 and 6 through the control valve, the hydraulic brake pressure applied to the rear wheel cylinder 5 and 6 is restrictively controlled or appropriately reduced in order to prevent the vehicle from skidding.

The deceleration-sensitive type hydraulic brake pressure control valve according to the present invention roughly comprises a valve housing 20, a plug section 30, a control plunger section 40, a dual poppet valve section 50, an enclosed pressure chamber section 60 a solenoid plunger section 70, and a deceleration detecting section 80.

In the valve housing 20, there are coaxially formed a first large-diameter bore 21, a first medium-diameter bore 22, a first small-diameter bore 23 on the right hand in FIG. 3 and a second large-diameter bore 24 and a second small-diameter bore 25 on the left hand in FIG. 3 the second bores being arranged in parallel with the first bores. Further, a third large-diameter bore 26 and a third small-diameter bore 27 are coaxially formed on the lower left hand in FIG. 3.

The first inlet port 7 communicates with the first small-diameter bore 23 through a first inlet passage 7a and with the second small-diameter bore 25 through a second inlet passage 7b. The second small-diameter bore 25 communicates with the first medium-diameter bore 22 through an enclosed pressure passage $P_E$.

The first outlet port 9 communicates with the first large-diameter bore 21 near the lower end thereof and the second outlet port 10 also communicates with the same bore 21 near the medium portion thereof.

The plug section 30 includes a first plug 31 fixedly fitted to the first large-diameter bore 21 of the valve housing 20 from the upper side, a second plug 32 fixedly fitted to the first small-diameter bore 23 of the valve housing 20 from the lower side, and a third plug 33 fixedly fitted to the second large-diameter bore 24 of the valve housing 20.

In the first plug 31, there is formed a second inlet passage 8a at the center thereof so as to communicate with the first large-diameter bore 21.

The control plunger section 40 comprises a plunger stopper 41, a control plunger body with a first flange portion 42 and a second flange portion (or ring) 43 and a poppet valve seat 44, and a control plunger spring 45. The control plunger 40 is slidably fitted to the first medium bore 22 and the first small bore 23 until the plunger stopper 41 is brought into contact a shoulder portion formed between the first large and medium bores 21 and 22. The first flange portion 42 is slidably fitted to the first medium bore 22 and the second flange portion (ring) 43 fixed to the plunger body is slidably fitted to the first small bore 23. Further, the poppet valve seat 44 is fixed to the lower end of the control plunger body. The control plunger spring 45 is disposed between the first poppet valve seat 44 and the second plug 32 in order to urge the control plunger 40 in the upward direction in the drawing.

The dual poppet valve section 50 comprises a valve stem 51, a first poppet valve 52, a free piston 53, a second poppet valve 54, a first dual poppet valve spring 55, a second dual poppet valve spring 56, and a valve holder 57.

The valve stem 51 is loosely passed through the central bore formed in the control plunger body. The first poppet valve 52 is fixed to the valve stem 51 at the lower end thereof so as to be seated against the first valve seat 44 fixed to the control plunger body at the lower end portion thereof. The free piston 53 is fixedly connected to the valve stem 51 at the upper end thereof. The second poppet valve 54 is fixed to the free piston 53 at the upper end portion thereof. The first dual poppet valve spring 55 is disposed between the shoulder portion of the first poppet valve 52 and the second plug 32 in order to urge the dual poppet valve section 50 in the upward direction in the drawing.

The second dual poppet valve spring 56 is disposed between the second poppet valve 54 and the small central bore formed within the valve holder 57 in order to urge the dual poppet valve section 50 in the downward direction in the drawing.

Further, the valve holder 57 is fixedly fitted to the first large-diameter bore 21 of the valve housing 20. In this valve holder 57, there are formed a large-diameter bore to which the free piston 53 of the dual poppet valve section 50 is slidably fitted, and a small diameter bore to which the second poppet valve 54 is loosely inserted. Further, the reference numeral 58 denotes a second poppet valve seat against which the second poppet valve 54 is brought into contact. The reference label $C_{O1}$ denotes a first outlet chamber communicating with the first outlet port 9 of the control valve. The reference label $C_{O2}$ denotes a second outlet chamber communicating with the second outlet port 9. The reference label $C_I$ denotes an inlet chamber communicating with the first inlet port 7 through the first inlet passage 7a.

To assemble the above-mentioned elements or parts into the first three-bores 21, 22, and 23 formed in the valve housing 20, first the control plunger 40 is inserted into the bores 22 and 23 with the first flange portion 42 thereof slidably fitted to the medium-diameter bore 22 and the second flange (ring) portion 43 thereof slidably fitted to the small-diameter bore 23 until the stopper 41 is brought into contact with the shoulder portion formed between two bores 22 and 23; secondly the poppet stem 51 is passed through the central bore of the control plunger 50; thirdly the first poppet valve 52 is fixed to the valve stem 51 at the lower end thereof; fourthly the first poppet valve spring 55 and the control plunger spring 45 are disposed before fixedly fitting the second plug 32 to the small-diameter bore 23 from lower side; fifthly the second poppet valve spring 56 is disposed before fixedly fitting the valve holder 57; lastly the first plug 31 is fixedly inserted into the large-diameter bore 21 from the upper side.

Under the condition thus assembled as described above, it should be noted that an inlet port chamber $C_I$ is formed between the control plunger 40 and the second plug 32, an enclosed pressure chamber $C_E$ is formed between the first flange portion 42 and the second flange portion 43 of the control plunger 40, a first outlet port chamber $C_{O1}$ is formed between the lower end of the valve holder 57 and the stopper portion 41 of the control plunger 40, and a second outlet port chamber $C_{O2}$ is formed within the valve holder 57.

The enclosed pressure chamber section 60 comprises a piston 61 slidably fitted to the second small-diameter bore 25 formed in the valve housing 20, a first small-diameter washer 62 fitted to the smallest-diameter portion of the piston 61, a second large-diameter washer 63 loosely fitted to the medium-diameter portion of the piston 61, a first small-diameter weak-compression force spring 64 disposed between the first small-diameter washer 62 and the third plug 33 and a second large-diameter strong-compression force spring 65 disposed between the second large-diameter washer 63 and the third plug 33.

Therefore, when the piston 61 is urged in the upward direction, the top end surface of the medium-diameter portion of the piston 61 pushes the first washer 62 against the elastic force of the first weak-compression force spring 64 and thereafter the top end surface of the large-diameter portion of the piston 61 pushes the second washer 63 against the elastic force of the second strong-compression force spring 65 in addition to that of the first weak-compression force spring 64.

Further, it should be noted that an enclosed chamber $C_E$ is also formed under the piston 61 within the second small-diameter bore 25 when the second inlet passage 7b is completely blocked.

The solenoid plunger section 70 comprises a solenoid coil 71 disposed within the third large-diameter bore 26 in the valve housing 20, and a solenoid plunger 72 disposed within the central hole of the solenoid coil 71.

Therefore, when the solenoid coil 71 is energized and therefore the solenoid plunger 72 projects in the upward direction, the second inlet passage 7b is blocked by the top end surface of the solenoid plunger 72 to enclose a hydraulic brake pressure within the enclosed pressure chamber $C_E$ and the enclosed pressure passage $P_E$.

The deceleration detecting section 80 comprises a power supply 81, a deceleration sensor 82, a transistor 83, a solenoid coil 84, and a pair of solenoid contacts 85. The deceleration sensor 82 is such a switch that the contact points are open when deceleration rate is relatively low but closed when deceleration rate exceeds a predetermined value.

Therefore, when the vehicle is decelerated and therefore the deceleration rate exceeds a predetermined value, the deceleration sensor 82 is closed to apply a voltage from the power supply 81 to the base of the transistor 83, so that the transistor 83 is turned on to energize the solenoid coil 84. With a result, the solenoid contacts 85 are closed to energize the plunger solenoid coil 71, that is, to block the second inlet passage 7a.

Here, it should be noted that a square hole 72a is formed at the top end portion of the solenoid plunger 72. This square hole 72a serves to easily pass the hydraulic fluid from the inlet port 7 to the inlet port chamber $C_I$ via the first inlet passage 7a.

Figure 4:
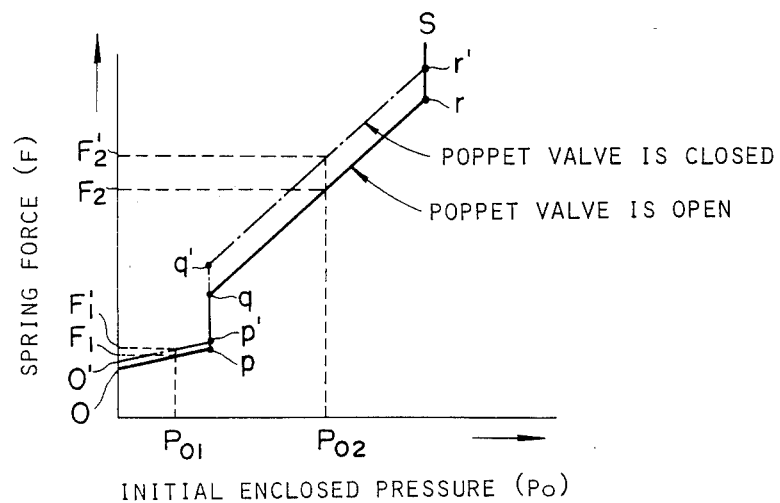
FIG. 4 is a graphical representation showing the relationship between the initially enclosed hydraulic brake pressure and the spring force applied to the piston disposed within the enclosed pressure chamber by means of two weak and strong springs.

FIG. 4 shows the relationship between the hydraulic brake pressure $P_0$ initially enclosed within the enclosed pressure chamber $C_E$ and the force applied to the first small-diameter weak-compression force spring 64 and the second large-diameter strong-compression force spring 65.

In FIG. 4, the point 0 indicates a force initially set or loaded to the first weak-compression force spring 64, because the spring 64 is installed in an initially-compressed state; the vertical line p-q indicates a force initially set or loaded to the second strong-compression force spring 65 because the spring 65 is installed in an initially-compressed state. Therefore, by adjusting this initially set force of the spring 65, it is possible to obtain any desired initial enclosed brake pressure $P_{02}$, for instance.

The solid line o-p indicates the gradient of the force applied to the first weak-compression force spring 64 by the enclosed critical hydraulic brake pressure $P_0$; the solid line q-r also indicates the gradient of the sum total of the forces applied to the first weak-compression force spring 64 and the second strong-compression force spring 65 by the enclosed critical hydraulic brake pressure $P_0$.

Therefore, when the vehicle weight is relatively light (when unloaded) and therefore the critical hydraulic brake pressure $P_{01}$ at which the control valve according to the present invention begins to restrictively control the master cylinder brake pressure (this pressure is sensed by the deceleration sensor) is relatively low, only the first weak spring 64 is used for sustaining the low enclosed critical brake pressure $P_{01}$ and for controlling the relatively low rear wheel cylinder hydraulic brake pressure. In contrast with this, when the vehicle is relatively heavy (when loaded) and therefore the critical hydraulic brake pressure $P_{02}$ is relatively high, both the first weak spring 64 and the second strong spring 65 are used for sustaining the high enclosed critical brake pressure $P_{02}$ and for controlling the relatively high rear wheel cylinder hydraulic brake pressure.

The solid lines shown in FIG. 4 indicate the gradients of the spring force on the assumption that the volume of the enclosed pressure chamber $C_E$ is constant; in other words, the control plunger 40 stays at the upward position within the valve housing.

However, when the control plunger 40 moves in the downward direction to close the first poppet valve 52, since the volume of the enclosed pressure chamber $C_E$ is reduced, the enclosed critical brake pressure $P_0$ is increased. The dotted-and-dashed lines indicate similar gradients obtained when the poppet valve 52 is closed and therefore the volume of the enclosed pressure chamber $C_E$ is reduced.

As described already, the initially-enclosed critical hydraulic brake pressure $P_0$ increases with increasing vehicle weight. Therefore, when the vehicle is unloaded, the vehicle weight will be relatively light. Under these conditions, when the deceleration sensor 82 detects that the deceleration rate exceeds a predetermined value, the enclosed pressure chamber $C_E$ is enclosed under a relatively low enclosed pressure, for instance, at point $P_{01}$, so that a force $F_1$ is applied to the piston 61 by the weak-compression force spring 64 within the enclosed pressure chamber $C_E$ when the poppet valve 52 is open and a force $F_1'$ is applied to the piston 61 by the weaker spring 64 when the poppet valve 52 is closed.

On the other hand, when the vehicle is loaded, the vehicle weight will be relatively heavy. Under these conditions, when the deceleration sensor 82 detects that the deceleration rate exceeds a predetermined value, the enclosed pressure chamber $C_E$ is enclosed under a relatively high enclosed pressure, for instance, at point $P_{02}$, so that a force $F_2$ is applied to the piston 61 via both the weak spring 64 and the strong spring 65 within the enclosed chamber $C_E$ when the poppet valve 52 is open and a force $F_2'$ is applied to the piston 61 by both the springs 64 and 65 when the poppet valve 52 is closed.

The operation of the deceleration-sensitive type hydraulic brake pressure control valve according to the present invention shown in FIG. 3 will be described hereinbelow.

(1) Under the normal condition, the deceleration rate of an automotive vehicle is below a predetermined value. Therefore, the deceleration sensor 82 is open; the transistor 83 is off (since no base voltage is applied); the relay 84 is deenergized; the solenoid coil 71 is also deenergized; the solenoid plunger 72 stays within the solenoid coil 71, so that the inlet port 7 communicates with the lefthand enclosed chamber $C_E$ through the second inlet passage 7b.

In this case, when the brake pedal 2 is depressed gradually and therefore a hydraulic pressure is produced by the brake master cylinder 1, a master cylinder hydraulic brake pressure $P_m$ is applied from the first outlet port 1a of the master cylinder 1 to the front righthand wheel cylinder 3 directly and to the rear lefthand wheel cylinder 6 through the hydraulic brake control valve. In more detail, the pressure $P_m$ is applied from the first inlet port 7, through the first inlet passage 7a, the inlet port chamber $C_I$ formed between the control plunger 40 and the second plug 32, a clearance formed between the inner peripheral surface of the central bore of the control plunger 40 and the outer peripheral surface of the stem 51 of the dual poppet valve section 50 (because the first poppet valve 52 is opened by the control plunger spring 45), the first outlet port chamber $C_{01}$ formed between the bottom surface of the valve holder 57 and the top surface of the control plunger 40, to the first outlet port 9.

On the other hand, the master cylinder hydraulic pressure $P_m$ is simultaneously applied from the second outlet port 1b of the brake master cylinder 1 to the front lefthand wheel cylinder 4 directly and to the rear righthand wheel cylinder 5 through the hydraulic brake control valve. In more detail, the pressure $P_m$ is applied from the second inlet port 8 of the hydraulic pressure control valve, through the central bore formed within the valve holder 57, a clearance formed between the inner peripheral surface of the valve holder 57 and the outer peripheral surface of the second poppet valve 54 (because the second poppet valve 54 is open by the control plunger spring 45), the second outlet port chamber $C_{02}$ formed in the valve holder 57, to the second outlet port 10 of the hydraulic brake control valve. That is to say, the brake control valve according to the present invention passes the hydraulic brake pressure $P_m$ directly from the first inlet port 7 to the first outlet port 9 and from the second inlet port 8 to the second outlet port 10.

Under these conditions, the master cylinder hydraulic brake pressure $P_m$ is also applied to the enclosed pressure chamber $C_E$ formed between the lower surface of the first flange portion 42 of the control plunger 40 and the upper surface of the second flange portion 43 of the control plunger 40 through the second inlet port passage 7b and the enclosed passage $P_E$. Accordingly, no pressure difference is developed across the first and the second flange portions 42 and 43 of the control plunger 40.

In this case, the hydraulic brake pressure equation of the control plunger 40 can be expressed as follows:

$$P_o(A_2-A_3)+f>P_m(A_2-A_3) \tag{1}$$

where $P_o$ denotes the pressure within the enclosed pressure chamber $C_E$ (in this case, $P_o=P_m$), $A_2$ denotes the cross-sectional area of the medium-diameter bore 22, $A_3$ denotes the cross-sectional area of the small-diameter bore 23, and f denotes the elastic force of the control plunger spring 45.

The above expressin indicates that as long as $P_m$ is equal to $P_o$, that is, the enclosed pressure chamber $C_E$ is open, the control plunger 40 stays on the upward position as shown in FIG. 3.

Figure 5:
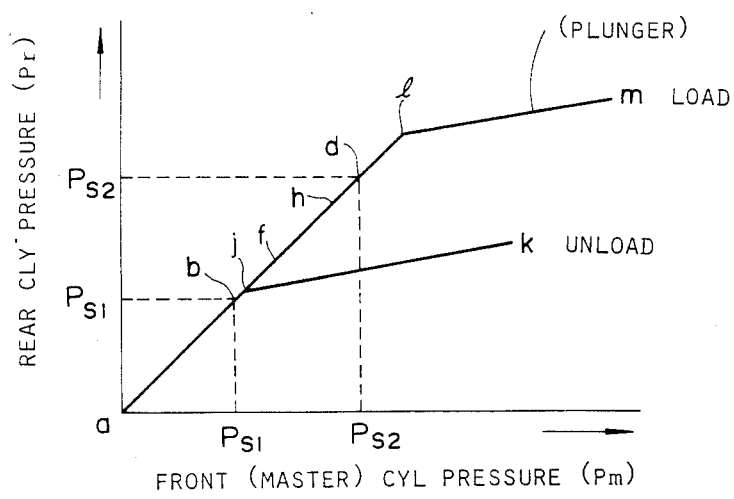
FIG. 5 is a graphical representation showing the relationship between the front (master) wheel cylinder hydraulic brake pressure in the first embodiment of the deceleration-sensitive type hydraulic brake pressure control valve for an automotive vehicle according to the present invention shown in FIG. 3.

Under these conditions, the relationship between the front wheel cylinder (or master cylinder) hydraulic brake pressure $P_m$ and the rear wheel cylinder hydraulic brake pressure $P_r$ can be represented by a line (a-b) shown in FIG. 5.

(2) When the brake pedal 2 is depressed, and therefore the deceleration rate of an automotive vehicle exceeds a predetermined value, the deceleration sensor 82 is closed; the transistor 83 is on (because a base voltage is applied); the relay 84 is energized; the solenoid coil 71 is energized; the solenoid plunger 72 projects from the solenoid coil 71, so that the second inlet passage 7b is blocked by the top end of the solenoid plunger 72. Therefore, the master cylinder hydraulic brake pressure $P_m$, obtained when the deceleration sensor 82 detects that the deceleration rate exceeds a predetermined value, is enclosed within the righthand enclosed pressure chamber $C_E$ formed between the first and second flange portions 42 and 43 of the control plunger 40, the enclosed passage $P_E$, and the lefthand enclosed pressure chamber $C_E$ formed under the piston 61. This enclosed pressure $P_o$ urges the control plunger 40 in the upward direction by a force expressed as $P_o \times (A_2-A_3)$ and the piston 61 also in the upward direction by another force expressed as $P_o \times A_p$ ($A_p$ denotes the cross-sectional area of the piston 61).

It should be noted that this enclosed hydraulic brake pressure $P_o$ increases with increasing vehicle weight. This is because the more the vehicle weight, the higher the master cylinder hydraulic brake pressure $P_m$, even if the deceleration rate detected by the deceleration sensor 82 is the same.

Therefore, in the case where the vehicle is unloaded, the enclosed pressure $P_o$ is relatively low, for instance, as shown at point $P_{01}$ in FIG. 4. This pressure $P_{01}$ may be sufficient to compress the first weak-compression force spring 64 but not sufficient to compress both the first weak-compression and the second strong-compression force springs 64 and 65.

On the other hand, in the case where the vehicle is loaded, the enclosed pressure $P_o$ is relatively high, for instance, as shown at point $P_{02}$ in FIG. 4. This pressure $P_{02}$ may be sufficient to compress both the first weak-compression and the second strong-compression force springs 64 and 65.

(2a) In the case where the vehicle weight is relatively light, that is, the vehicle is unloaded, if the brake pedal 2 is further depressed, the master cylinder brake pressure $P_m$ further increases ($P_o<P_m$), the hydraulic brake pressure equation of the control plunger 40 can be expressed as follows:

$$P_o(A_2-A_3)+f<P_m(A_2-A_3) \tag{2}$$

where $P_o(A_2-A_3)$ denotes a force applied to the control plunger 40 in the upward direction within the enclosed pressure chamber $C_E$, and $P_m(A_2-A_3)$ denotes a force applied to the control plunger 40 in the downward direction within the first medium- and small-diameter bores 22 and 23 (because the poppet valve 52 is open).

Therefore, the control plunger 40 begins to move in the downward direction while compressing the hydraulic fluid within the enclosed pressure chamber $C_E$ until the poppet valve seat 44 of the control plunger 40 is brought into contact with the first poppet valve 52 to close the first poppet valve. As a result, the hydraulic brake pressure $P_r$ applied to the rear wheel cylinder 6 does not rise. This pressure obtained when the first poppet valve is closed is called a first critical hydraulic brake pressure $P_{s1}$ (See FIG. 5). This critical pressure $P_{s1}$ can be expressed as follows:

$$P_{s1}=F_1'/A_p+f/(A_2-A_3) \tag{3}$$

where $F_1'$ denotes an elastic force applied by the first small-diameter spring 64 when the poppet valve 52 is closed and $A_3$ denotes the cross-sectional area of the piston 61.

Once the first poppet valve 52 is closed, a hydraulic force ($P_m \cdot A_3$) is applied to the control plunger 40 within the inlet port chamber $C_I$ in the upward direction; another hydraulic force ($P_r \cdot A_2$) is applied to the control plunger 40 within the first outlet port chamber $C_{01}$ in the downward direction.

Therefore, when the brake pedal 2 is still further depressed and, thereby, ($P_m \cdot A_3$) exceeds ($P_r \cdot A_2$), the control plunger 40 is moved in the upward direction, so that the first poppet valve 40 is opened again. As a result, the rear wheel cylinder hydraulic brake pressure $P_r$ increases due to an increase in the succeeding master cylinder hydraulic brake pressure $P_m$. When $P_m(A_2-A_3)$ (a succeeding force applied to the control plunger 40 in the downward direction within the first oulet port chmber $C_{01}$) exceeds $P_o(A_2-A_3)$ (a constant force applied to the control plunger 40 in the upward direction within the enclosed pressure chamber $C_E$), the control plunger 40 begins to move again in the downward direction, while compressing the hydraulic fluid within the enclosed pressure chamber $C_E$ until the poppet valve seat 44 of the control plunger 40 is brought into contact with the first poppet valve 52 to close the first poppet valve.

As described above, the first poppet valve 52 is repeatedly closed and opened and thereby the master cylinder hydraulic brake pressure $P_m$ is restrictively controlled or decreased into the rear wheel cylinder hydraulic brake pressure $P_r$.

The force applied to the control plunger 40 when $P_m$ is equal to or greater than $P_{s1}$ can be expressed by the following equation:

$$P_r A_2 = P_m \cdot A_3 + F_1'(A_2-A_3)/A_p + f \tag{3}$$

or $$P_r = P_m \cdot A_3/A_2 + F_1'(A_2-A_3)/A_p \cdot A_2 + f/A_2 \tag{4}$$

The above-expression indicates that the rear wheel cylinder hydraulic brake pressure $P_r$ increases in accordance with a gradient $A_3/A_2$ (smaller than one, because $A_3 < A_2$) as long as the master cylinder pressure $P_m$ is equal to or greater than the critical pressure $P_{s1}$.

The relationship between the front wheel cylinder (or master cylinder) hydraulic brake pressure $P_m$ and the rear wheel cylinder hydraulic brake pressure $P_r$ can be represented by a line (j-k) as shown in FIG. 5.

(2b) In the case where the vehicle weight is relatively heavy, that is, the vehicle is loaded, the pressure obtained when the first poppet valve is closed is called a second critical pressure $P_{s2}$ (See FIG. 5). This critical pressure $P_{s2}$ can be expressed as follows:

$$P_{s2} = F_2'/A_p + f/(A_2-A_3) \tag{3'}$$

where $F_2'$ denotes an elastic force applied by both the first small-diameter and the second large-diameter springs 64 and 65 when the poppet valve is closed and $A_p$ denotes the cross-sectional area of the piston 61.

The force applied to the control plunger 40 when $P_m$ is equal to or greater than $P_{s2}$ can be expressed by the following equation:

$$P_r A_2 = P_m \cdot A_3 + F_2'(A_2-A_3)/A_p + f \tag{3'}$$

or $$P_r = P_m \cdot A_3/A_2 + F_2'(A_2-A_3)/A_p \cdot A_2 + f/A_2 \tag{4'}$$

The above-expression indicates that the rear wheel cylinder hydraulic brake pressure $P_r$ increases in accordance with a gradient $A_3/A_2$ (smaller the one, because $A_3 < A_2$) as long as the master cylinder pressure $P_m$ is equal to or greater than the critical pressure $P_{s2}$.

The relationship between the front wheel cylinder (or master cylinder) hydraulic brake pressure $P_m$ and the rear wheel cylinder hydraulic brake pressure $P_r$ can be represented by a line (l-m) as shown in FIG. 5.

(3) In the case where the brake pedal 2 is released, the master cylinder hydraulic brake pressure $P_m$ is lowered and also the deceleration detecting sensor 82 is opened again. As a result, the transistor 83 is off; the relay 84 is deenergized; the solenoid coil 71 is also deenergized; the solenoid plunger 72 returns within the solenoid coil 71, so that the inlet port 7 communicates with the lefthand enclosed chamber $C_E$ through the second inlet passage 7b. The control valve returns to the original state as already described in item (1) above.

In the above description, the operation of only the first poppet valve 52 has been described. However, the same description can be applied to the second poppet valve 54 as follows:

(1) Under the normal condition, a master cylinder hydraulic brake pressure $P_m$ is applied from the second outlet port 1b of the master cylinder 1 to the front lefthand wheel cylinder 4 directly and to the rear righthand wheel cylinder 5 through the hydraulic brake control valve.

In more detail, the pressure $P_m$ is applied from the second inlet port 8 of the hydraulic pressure control valve, through the central bore formed within the valve holder 57, a clearance formed between the second poppet valve 54 and the second poppet valve seat 58 and the second outlet port chamber $C_{02}$, to the second outlet port 10 of the hydraulic brake control valve.

Further, when he enclosed chamber $C_E$ is enclosed and thereafter the control plunger 40 moves in the downward direction, the poppet valve seat 44 of the control plunger 40 is brought into contact with the first poppet valve 52 to close the valve. However, since the poppet valve section 50 is supported by the first poppet valve spring 55 at the lower end and by the second poppet valve spring 56 at the upper end, the poppet valve section 50 is further moved in the downward direction, after the first poppet valve 52 has been closed, until the second poppet valve 54 is brought into contact with the second poppet valve seat 58.

In the same way, when the control plunger 40 moves in the upward direction and therefore the first poppet valve seat 44 is brought away from the first poppet valve 52, the second poppet valve 54 is also brought away from the second poppet valve seat 58.

That is to say, whenever the first poppet valve 52 is opened or closed, the second poppet valve 54 is also opened or closed at almost the same timing.

In the above description, the control plunger 40 is provided with the control plunger spring 45 so as to urge the first poppet valve seat 44 toward the position at which the first poppet valve 52 is open. However, this spring 45 is only used for positioning the control plunger 40 in position. Therefore, it is possible to use a spring having a weak compression force or a weak initially-set compression force or to eliminate this spring 45.

In the deceleration-sensitive type hydraulic brake pressure control valve according to the present invention shown in FIG. 3, the top end 72a of the solenoid plunger 72 in the solenoid plunger section 70 is disposed within a space between the first inlet port 7 and the first inlet passage 7a through which the hydraulic fluid is flowing. Therefore, if an abrupt brake force is applied to the master cylinder 1 and therefore the master cylinder hydraulic brake pressure $P_m$ rises sharply, the solenoid plunger 72 is subject to the fluid pressure in the direction perpendicular to the axis of the plunger 72, thus resulting in an increase in friction force between the outer peripheral surface of the plunger 72 and the inner peripheral surface of the bore 27 formed in the valve housing. To overcome this problem, a square hole 72a is formed at the top end of the plunger to reduce the influence of change in fluid pressure. However, it is preferable to avert the influence of the hydraulic pressure completely.

Figure 6:
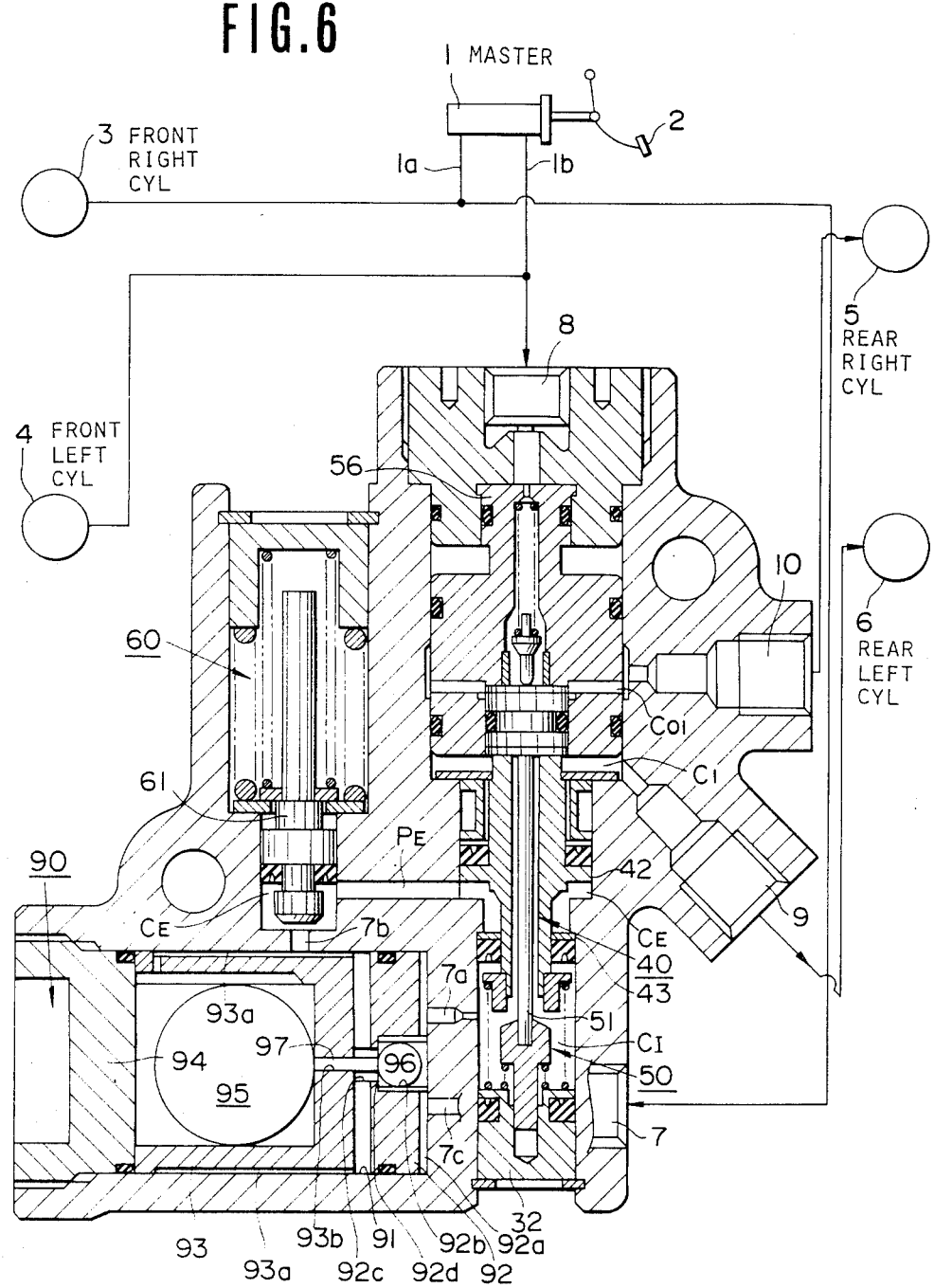
FIG. 6 is a cross-sectional view of a second embodiment of the deceleration-sensitive type hydraulic brake pressure control value for an automotive vehicle according to the present invention.

FIG. 6 shows a second embodiment of the deceleration-sensitive type hydraulic brake pressure control valve according to the present invention, in which a gravity ball section 90 (called G ball) is provided, instead of the solenoid plunger section 70 and the deceleration detecting section 80 both shown in FIG. 3.

In FIG. 6, a large-diameter blind bore 91 is laterally formed in the control valve housing. At the bottom of the bore 91, there are formed a first inlet passage 7a communicating with the inlet port chamber $C_I$ formed between the second flange portion 43 of the control plunger 40 and the second plug 32, a third inlet passage 7c communicating with the first inlet port 7, and a second inlet passage 7b communicating with the enclosed pressure chamber $C_E$ formed under the piston 61.

The reference numeral 92 denotes a ball valve holder fixedly fitted to the bore 91. This ball valve holder 92 is formed with grooves 92a on one flat surface thereof so as to communicate with the first inlet passages 7a and the second inlet passage 7b. The ball valve holder 92 is formed with a large-diameter bore 92b and a small-diameter bore 92c at the center thereof. The reference numeral 93 denotes a ball guide housing also fixedly fitted to the bore 91. This ball guide housing 93 is formed with grooves 93a on the outer peripheral surface thereof in he axial direction thereof so as to communicate with the second inlet passage 7b. The reference 94 denotes a fourth plug to fix the ball guide housing 93 and the ball valve holder 92 in position.

A gravity ball 95 is rotatably housed within the ball guide housing 93 and a ball valve 96 is slidably housed within the large-diameter bore 92b of the ball valve holder 92.

The gravity ball 95 is connected to the ball valve 96 by a ball stem 97, so that when the gravity ball 95 is in contact with the bottom of the ball guide housing 93 (moved in the rightward direction in FIG. 6), the valve ball 96 is brought away from the valve ball seat 92d of the ball valve holder 92 and when the gravity ball 95 is moved in the leftward direction in FIG. 6, the valve ball 96 is brought into contact with the valve ball seat 92d of the ball valve holder 92.

The deceleration-sensitive type hydraulic brake pressure control valve according to the present invention is installed on a vehicle in such a way that when the vehicle is running under a normal condition, the ball 95 is brought into contact with the bottom of the ball guide housing 95 to open the ball valve 96 by inclining the control valve by a predetermined angle and when the vehicle is being decelerated, the ball 95 can be moved in the leftward direction in FIG. 6 to close the ball valve 96.

The operation of the second embodiment of the deceleration-sensitive type hydraulic brake pressure control valve according to the present invention will be described hereinbelow.

Under the normal condition, the deceleration rate of an automotive vehicle is below a predetermined value. Therefore, the gravity ball 95 is in contact with the bottom of the ball guide housing 93 and thus the ball valve 96 is open.

In this case, when the brake pedal 2 is depressed and therefore a hydraulic brake pressure is produced by the master cylinder 1, a master cylinder hydraulic brake pressure $P_m$ is applied from the first outlet port 1a of the master cylinder 1 to the front righthand wheel cylinder 3 directly and to the rear lefthand wheel cylinder 6 through the hydraulic brake control valve. In more detail, the pressure $P_m$ is applied from the first inlet port 7 of the hydraulic pressure control valve, through the third inlet passage 7c, the grooves 92a, the first inlet passage 7a, the inlet port chamber $C_I$ formed between the control plunger 40 and the second plug 32, a clearance formed between the inner peripheral surface of the central bore of the control plunger 40 and the outer peripheral surface of the stem 51 of the dual poppet valve section 50, the first outlet port chamber $C_{01}$ formed between the bottom surface of the valve holder 57 and the top surface of the control plunger 40, to the first outlet port 9 of the hydraulic brake control valve.

Under these conditions, the master cylinder hydraulic brake pressure $P_m$ is also applied to the enclosed chamber $C_E$ formed between the lower surface of the first flange portion 42 of the control plunger 40 and the upper surface of the second flange portion 43 of the control plunger 40, through the third inlet passage 7c, the grooves 92a, the ball valve 96, the chamber formed between the ball guiding housing 93 and the ball valve holder 92, the grooves 93a, the second inlet passage 7b, the enclosed chamber $C_E$ formed under the piston 61 of the dual spring section 60, and the enclosed passage $P_E$.

When the brake pedal 2 is depressed, and therefore the deceleration rate of an automotive vehicle exceeds a predetermined value, the gravity ball 95 moves in the frontward direction to close the ball valve 96, so that the chamber formed between the ball guide housing 93 and the ball valve holder 92 is blocked. Therefore, the master cylinder hydraulic brake pressure $P_m$ obtained when the gravity ball 95 detects that the deceleration rate exceeds a predetermined value is enclosed within the clearance between the ball guide housing 93 and the ball valve holder 92, the grooves 93a, the second inlet passage 7b, the enclosed chamber $C_E$, the enclosed passage $P_E$ and the other enclosed chamber $C_E$, in the same way as described in FIG. 3.

As described above, in the deceleration-sensitive type hydraulic brake pressure control valve according to the present invention, since there are provided an enclosed chamber piston and two springs (a first weak spring and a second strong spring) in order to urge the piston against the enclosed hydraulic brake pressure by the first weak spring when the vehicle is unloaded but by both the first and second springs after the first weak spring has been compressed by a predetermined distance when the vehicle is loaded, and since the hydraulic brake pressure enclosed within the enclosed pressure chamber is further increased when the control plunger moves in the direction that the dual poppet valves are closed, it is possible to prevent the enclosed critical hydraulic brake pressure from increasing excessively when the vehicle is unloaded and from decreasing excessively when the vehicle is loaded, that is, to provide an almost ideal ratio of front wheel cylinder hdyraulic brake pressure to rear wheel cylinder hydraulic brake pressure, irrespective of vehicle weight and the increase rate of hydraulic brake pressure, for locking the front and rear wheels simultaneously.

Further, since there are provided a ball valve and a gravity ball disposed separately from the inlet passage in which the master cylinder hydraulic brake pressure is directly applied, it is possible to improve the reliability of response speed of the deceleration detecting means, irrespective of the increasing rate of hydraulic brake pressure, for locking the rear wheels at an appropriate timing by a sufficient brake force.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A deceleration-sensitive type hydraulic brake pressure control valve for an automotive vehicle for restrictively controlling the hydraulic brake pressure supplied from a master cylinder to rear wheel cylinders when the vehicle is being decelerated beyond a predetermined value, said hydraulic brake pressure control valve comprising:
    (a) a valve housing including:
        (1) at-least one inlet port to which the master cylinder is connected;
        (2) at-least one outlet port to which the rear wheel cylinder is connected; and
        (3) an enclosed pressure chamber within which a master cylinder hydraulic brake pressure is enclosed when the deceleration rate of the vehicle exceeds the predetermined value;
    (b) control plunger means including a poppet valve responsive to pressure in said inlet port for restrictively controlling the inlet port pressure and for supplying the controlled pressure to the rear wheel cylinders through said outlet port, said control plunger means being urged in the direction that said poppet valve is opened in cooperation with said control plunger means when the vehicle deceleration rate is below the predetermined value but urged in the direction that said poppet valve is closed in cooperation with said control plunger means to reduce the volume of said enclosed pressure chamber when vehicle deceleration rate exceeds the predetermined value;
    (c) enclosed chamber piston means disposed within said enclosed pressure chamber so as to sustain an enclosed hydraulic pressure applied thereto;
    (d) first spring means for always urging said piston against the enclosed hydraulic pressure within said enclosed pressure chamber;
    (e) second spring means for urging said piston means against the enclosed hydraulic pressure within said enclosed pressure chamber together with said first spring when said piston means is urged beyond a predetermined distance, spring constant of said second spring means being greater than that of said first spring means; and
    (f) deceleration-sensitive means for generating an enclosed hydraulic brake pressure within said enclosed pressure chamber, said means being actuated when the deceleration rate of the vehicle exceeds the predetermined value,
    whereby the enclosed pressure is controlled by said first weak spring in order to prevent the enclosed pressure from increasing excessively when the unloaded vehicle is decelerated and the enclosed pressure is controlled by both said first weak spring and said second strong spring in order to prevent the enclosed pressure from decreasing excessively.

2. A deceleration-sensitive type hydraulic brake pressure control valve for an automotive vehicle for restrictively controlling the hydraulic brake pressure supplied from a master cylinder to rear wheel cylinders when the vehicle is being decelerated beyond a predetermined value, said hydraulic brake pressure control valve comprising:
    (a) a valve housing including:
        (1) at-least one inlet port to which the master cylinder is connected;
        (2) at-least one outlet port to which the rear wheel cylinder is connected; and
        (3) an enclosed pressure chamber within which a master cylinder hydraulic brake pressure is enclosed when the deceleration rate of the vehicle exceeds the predetermined value;
    (b) control plunger means having a central bore, two different diameter flange portions, and a poppet valve seat, the enclosed pressure chamber communicating with between said two different diameter flange portions, the inlet port communicating with one end surface of said plunger means on the poppet valve seat side, the outlet port communicating with the other end surface of said plunger means;
    (c) poppet valve means so disposed as to face the poppet valve seat of said control plunger means;
    (d) enclosed chamber piston means disposed within said enclosed pressure chamber so as to sustain an enclosed hydraulic pressure applied thereto;
    (e) first spring means for always urging said piston against the enclosed hydraulic pressure within said enclosed pressure chamber;
    (f) second spring means for urging said piston means against the enclosed hydraulic pressure within said enclosed pressure chamber after said first spring has been deformed a predetermined distance, in cooperation with said first spring, spring constant of said second spring means being greater than that of said first spring means; and
    (g) deceleration-sensitive means for generating an enclosed hydraulic brake pressure within said enclosed pressure chamber, said means being actuated when the deceleration rate of the vehicle exceeds the predetermined value;
    (h) when the deceleration rate of the vehicle is below the predetermined value, the hydraulic brake pressure from the master cylinder being directly supplied from said inlet port to said outlet port and into said enclosed pressure chamber; and when the deceleration rate of the vehicle is above the predetermined value and said deceleration-sensitive means is actuated to block said enclosed pressure chamber, the hydraulic brake pressure from the master cylinder being restrictively controlled when passing from said inlet port to said outlet port, in such a way that said poppet valve seat is repeatedly brought into contact with or away from said poppet valve due to the pressure difference between the enclosed hydraulic brake pressure $P_o$ applied to between two different diameter flange portions of said control plunger and the master cylinder hydraulic brake pressure $P_m$ across both the end surfaces of said control plunger, whereby the enclosed pressure is controlled by said first spring in order to prevent the enclosed pressure from increasing excessively when the unloaded vehicle is decelerated and the enclosed pressure is controlled by both said first spring and said second spring in order to prevent the enclosed pressure from decreasing excessively while reducing the volume of said enclosed chamber by the motion of said control plunger when the vehicle is decelerated.

3. A deceleration-sensitive type hydraulic brake pressure control valve for an automotive vehicle as set forth in claim 2, wherein said deceleration-sensitive means comprises:
   (a) deceleration sensor means for outputting a deceleration signal when the deceleration rate of the vehicle exceeds a predetermined value;
   (b) plunger solenoid means energized in response to the deceleration signal; and
   (c) solenoid plunger means for blocking said enclosed pressure chamber to generate an enclosed hydraulic pressure when said plunger solenoid means is energized.

4. A deceleration-sensitive type hydraulic brake pressure control valve for an automotive vehicle as set forth in claim 2, wherein said deceleration-sensitive means comprises:
   (a) a gravity ball guide housing disposed separately from said first inlet port in which master cylinder hydraulic brake pressure is applied;
   (b) a gravity ball disposed in said guide housing so as to move in the frontward direction when the vehicle is decelerated beyond a predetermined value;
   (c) a ball valve holder disposed in said first inlet port and formed with a ball valve seat;
   (d) a ball valve disposed facing said ball valve seat; and
   (e) a connecting rod slidably fitted to a hole of said gravity ball guide housing, one end of which is connected to said gravity ball and the other end of which is connected to said ball valve, when the deceleration rate of the vehicle is below a prdetermined value, said ball valve is brought away from said ball valve seat to communicate said inlet port with said enclosed chamber but when the deceleration rate of the vehicle is above a predetermined value, said ball valve is brought into contact with said ball valve seat to block said enclosed pressure chamber to generate enclosed pressure.

5. A deceleration-sensitive type hydraulic brake pressure control valve for an automotive vehicle as set forth in claim 2, wherein said second spring means is disposed for urging said piston against the enclosed hydraulic pressure in such a way that a predetermined initially-set compression force is previously applied to said second spring means.

6. A deceleration-sensitive type hydraulic brake pressure control valve for an automotive vehicle as set forth in claim 2, which further comprises:

(a) a second outlet port to which the rear wheel cylinder is connected, said second outlet port being formed within said valve housing;
(b) a second poppet valve seat fixed to said valve housing; and
(c) second poppet valve means so disposed as to face said second poppet valve seat;

said second poppet valve means being brought into contact with or away from said second poppet valve seat in synchronization with the motion of said first poppet valve means.

7. A deceleration-sensitive type hydraulic brake pressure control valve for an automotive vehicle for restrictively controlling hydraulic pressure supplied from a master cylinder to rear wheel cylinders when the vehicle is being decelerated beyond a predetermined value, said hydraulic brake control valve comprising:

(a) a valve housing including:
   (1) at-least one inlet port to which the master cylinder is connected;
   (2) at-least one outlet port to which the rear wheel cylinder is connected;
   (3) a first large-diameter bore communicating with said at-least one outlet port;
   (4) a first medium-diameter bore;
   (5) a first small-diameter bore, said first large-, medium- and small-diameter bores being formed coaxially in said valve housing;
   (6) a second large-diameter bore;
   (7) a second small-diameter bore, said second large- and small-diameter bores being formed coaxially in said valve housing;
   (8) an enclosed pressure passage $P_E$ communicating between said first medium-diameter bore and said second small-diameter bore;
   (9) a first inlet port passage communicating between said at-least one inlet port and said first small-diameter bore; and
   (10) a second inlet port passage communicating between said at-least one inlet port and said second small-diameter bore;

(b) a control plunger having a large-diameter flange portion, a small-diameter flange portion, a poppet valve seat, and a central bore, said large-diameter flange portion being slidably fitted to said first medium-diameter bore, said small-diameter flange portion being slidably fitted to said first small-diameter bore, an enclosed pressure chamber $C_E$ being formed between said two larger- and small-diameter flange portions so as to communicate with said enclosed pressure passage, an outlet port chamber $C_o$ being formed above said large-diameter flange portion and within said first large-diameter bore so as to communicate with said outlet port, an inlet port chamber $C_I$ being formed under said small-diameter flange portion and within said first small-diameter bore so as to communicate with said first inlet port passage;

(c) a poppet valve disposed facing the poppet valve seat of said control plunger, said poppet valve being opened to communicate said inlet port chamber with said outlet port chamber when said poppet valve is brought away from said poppet valve seat and being closed not to communicate said inlet port chamber with said outlet port chamber when said poppet valve is brought into contact with said poppet valve seat;

(d) an enclosed chamber piston having a large-diameter portion and a small-diameter portion, said large-diameter portion being slidably fitted to said second small-diameter bore so as to form an enclosed pressure chamber within said second small-diameter bore;

(e) a first weak-compression force spring housed within said second large-diameter bore so as to be in contact with said small diameter portion of said enclosed chamber piston to always urge said piston against the enclosed pressure developed within said enclosed chamber $P_E$;

(f) a second strong-compression force spring also housed within said second large-diameter bore so as to be in contact with said large-diameter portion of said enclosed chamber piston for urging said piston against the enclosed pressure developed within said enclosed chamber $P_E$ in cooperation with said first weak-compression force spring after said first weak-compression force spring has been compressed a predetermined distance; and (g) deceleration-sensitive means for blocking said second inlet port passage communicating between said at-least one inlet port and said second small-diameter bore to generate an enclosed pressure within said second small-diameter bore $C_E$, said enclosed passage $P_E$, and said enclosed pressure chamber $C_E$, said blocking means being actuated when the deceleration rate of the vehicle exceeds a predetermined value;

(h) when the deceleration rate of the vehicle is below a predetermined value, the hydraulic brake pressure from the master cylinder is directly supplied from said inlet port, through said inlet port passage, the central bore of said control plunger and said outlet port chamber, to said outlet port, and when the deceleration rate of the vehicle is above the predetermined value and said blocking means is actuated to block said second inlet port passage, the hydraulic brake pressure from the master cylinder is restrictively reduced repeatedly when passing from said inlet port to said outlet port, in such a way that when said deceleration-sensitive means is actuated, the enclosed pressure urges said control plunger in the direction that said poppet valve is opened and when said poppet valve is closed, the inlet hydraulic pressure urges said control plunger in the direction that said poppet valve is closed, whereby the enclosed pressure is controlled by said first weak-compression force spring in order to prevent the enclosed pressure from increasing excessively when the unloaded vehicle is decelerated and the enclosed pressure is controlled by said first weak-compression force spring and said second strong-compression force spring in order to prevent the enclosed pressure from decreasing excessively while reducing the volume of said enclosed chamber by the motion of said control plunger when the loaded vehicle is decelerated.

8. A deceleration-sensitive type hydraulic brake pressure control valve for an automotive vehicle as set forth in claim 7, wherein said deceleration-sensitive means comprises:

(a) a deceleration sensor for outputting a deceleration signal when the deceleration rate of the vehicle exceeds a predetermined value;

(b) a plunger solenoid energized in response to the deceleration signal; and (c) a solenoid plunger for blocking said second inlet port passage communicating between said at-least one inlet port and said second small-diameter bore to generate an enclosed pressure within said second small-diameter bore $C_E$, said enclosed passage $P_E$ and said enclosed chamber $C_E$, said solenoid plunger being actuated when said plunger solenoid is energized.

9. A deceleration-sensitive type hydraulic brake pressure control valve for an automotive vehicle as set forth in claim 7, wherein said deceleration sensitive means comprises:

(a) a gravity ball guide housing disposed separately from said first inlet port passage communicating between said at-least one inlet port and said first small-diameter bore;

(b) a gravity ball disposed in said guide housing so as to move in the frontward direction when the vehicle is decelerated beyond a predetermined value;

(c) a ball valve holder disposed in said first inlet port passage and formed with a ball valve seat;

(d) a ball valve disposed facing said ball valve seat;

(e) a connecting rod slidably fitted to a hole of said gravity ball guide housing, one end of which is connected to said gravity ball and the other end of which is connected to said ball valve, when the deceleration rate of the vehicle is below a predetermined value, said ball valve is brought away from said ball valve seat to communicate said inlet port passage with said enclosed pressure chamber but when the deceleration rate of the vehicle is above a predetermined value, said ball valve is brought into contact with said ball valve seat to block said enclosed chamber to generate enclosed pressure.

10. A deceleration-sensitive type hydraulic brake pressure control valve for an automotive vehicle as set forth in claim 7, wherein said second strong compression force spring is housed within said second large-diameter bore for urging said piston against the enclosed hydraulic pressure in such a way that a predetermined initially-set compression force is previously applied to said strong spring means.

11. A deceleration-sensitive type hydraulic brake pressure control valve for an automotive vehicle as set forth in claim 7, which further comprises:

(a) a second outlet port to which the rear wheel cylinder is connected, said second outlet port being formed within said valve housing;

(b) a second poppet valve seat fixed to said valve housing; and (c) second poppet valve means connected so disposed as to face said second valve seat;

said second poppet valve means being brought into contact with or away from said second poppet valve seat in synchronization with the motion of said first poppet valve means.

* * * * *